(12) United States Patent
Bush

(10) Patent No.: US 11,487,732 B2
(45) Date of Patent: Nov. 1, 2022

(54) DATABASE KEY IDENTIFICATION

(71) Applicant: Ab Initio Technology LLC, Lexington, MA (US)

(72) Inventor: Timothy Spencer Bush, Oxfordshire (GB)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 14/156,544

(22) Filed: Jan. 16, 2014

(65) Prior Publication Data

US 2015/0199352 A1 Jul. 16, 2015

(51) Int. Cl.
*G06F 16/22* (2019.01)
*G06F 16/2455* (2019.01)
(Continued)

(52) U.S. Cl.
CPC ........ *G06F 16/2255* (2019.01); *G06F 16/211* (2019.01); *G06F 16/215* (2019.01); *G06F 16/2237* (2019.01); *G06F 16/24558* (2019.01)

(58) Field of Classification Search
CPC ........... G06F 17/3033; G06F 17/30303; G06F 17/30292; G06F 17/30324;
(Continued)

(56) References Cited

U.S. PATENT DOCUMENTS 5,179,643 A 1/1993 Homma et al.
5,566,072 A 10/1996 Momose et al.
(Continued)

FOREIGN PATENT DOCUMENTS

CN 1853181 10/2006
CN 101191069 6/2008
(Continued)

OTHER PUBLICATIONS

TANE: An Efficient Algorithm for Discovering Functional and Approximate Dependencies, YKA HUHTALA, Sep. 17, 1998, vol. 42, No. 2, pp. 100-101.*
(Continued)

*Primary Examiner* — Hosain T Alam
*Assistant Examiner* — Tracy M McGhee
(74) *Attorney, Agent, or Firm* — Fish & Richardson P.C.

(57) ABSTRACT

Methods, systems, and apparatus, including computer programs encoded on computer storage media, for database key identification. One of the methods includes receiving an identification of a first field in a first data set, the first data set including records. The method includes identifying a set of values, the set including, for each record, a value associated with the field. The method includes generating a filter mask based on the set of values, where application of the filter mask is capable of determining that a given value is not in the set of values. The method includes receiving a second data set including a second field, the second data set including records. The method includes determining a count of a number of records in the second data set having a value associated with the second field that passes the filter mask. The method also includes storing the count in a profile.

18 Claims, 5 Drawing Sheets

(51) Int. Cl.
*G06F 16/215* (2019.01)
*G06F 16/21* (2019.01)

(58) Field of Classification Search
CPC ............... G06F 17/30495; G06F 17/30; G06F 16/2255; G06F 16/24558; G06F 16/215; G06F 16/2237; G06F 16/211
USPC .................................................. 707/747, 745
See application file for complete search history.

(56) References Cited

U.S. PATENT DOCUMENTS

| | | | |
|---|---|---|---|
| 5,742,806 A | 4/1998 | Reiner et al. | |
| 5,842,200 A | 11/1998 | Agrawal et al. | |
| 5,845,285 A | 12/1998 | Klein | |
| 5,966,072 A | 10/1999 | Stanfill et al. | |
| 6,134,560 A | 10/2000 | Kliebhan | |
| 6,138,123 A | 10/2000 | Rathbun | |
| 6,163,774 A | 12/2000 | Lore et al. | |
| 6,343,294 B1 | 1/2002 | Hawley | |
| 6,553,366 B1 | 4/2003 | Miller et al. | |
| 6,601,048 B1 | 7/2003 | Gavan et al. | |
| 6,657,568 B1 | 12/2003 | Coelho et al. | |
| 6,741,995 B1 | 5/2004 | Chen et al. | |
| 6,788,302 B1 | 9/2004 | Ditlow et al. | |
| 6,801,938 B1 | 10/2004 | Bookman et al. | |
| 6,959,300 B1 | 10/2005 | Caldwell et al. | |
| 7,013,290 B2 | 3/2006 | Ananian | |
| 7,039,627 B1 | 5/2006 | Modelski et al. | |
| 7,047,230 B2 | 5/2006 | Gibbons | |
| 7,058,819 B2 | 6/2006 | Okaue | |
| 7,117,222 B2 | 10/2006 | Santosuosso | |
| 7,376,656 B2 | 5/2008 | Blakeley et al. | |
| 7,403,942 B1 | 7/2008 | Bayliss | |
| 7,433,861 B2 | 10/2008 | Santosuosso | |
| 7,698,163 B2 | 4/2010 | Reed et al. | |
| 7,756,873 B2 | 7/2010 | Gould et al. | |
| 7,813,937 B1 | 10/2010 | Pathria et al. | |
| 7,849,075 B2 | 12/2010 | Gould et al. | |
| 7,958,142 B2 | 6/2011 | Li et al. | |
| 8,069,129 B2 | 11/2011 | Gould et al. | |
| 8,145,642 B2* | 3/2012 | Cruanes ............ | G06F 17/30498 707/745 |
| 8,296,274 B2 | 10/2012 | Leppard | |
| 8,666,919 B2 | 3/2014 | Miranda | |
| 9,336,246 B2 | 5/2016 | Gorelik | |
| 11,163,670 B2 | 11/2021 | Isman et al. | |
| 2002/0120602 A1 | 8/2002 | Overbeek et al. | |
| 2002/0161778 A1 | 10/2002 | Linstedt | |
| 2002/0198877 A1 | 12/2002 | Wolff et al. | |
| 2003/0023868 A1 | 1/2003 | Parent | |
| 2003/0033138 A1 | 2/2003 | Bangalore et al. | |
| 2003/0140027 A1 | 7/2003 | Huttel et al. | |
| 2004/0023666 A1 | 2/2004 | Moon et al. | |
| 2004/0049492 A1 | 3/2004 | Gibbons | |
| 2004/0073534 A1 | 4/2004 | Robson | |
| 2004/0083199 A1 | 4/2004 | Govindugari et al. | |
| 2004/0111410 A1 | 6/2004 | Burgoon et al. | |
| 2004/0181514 A1 | 9/2004 | Santosuosso | |
| 2004/0181533 A1 | 9/2004 | Santosuosso | |
| 2004/0249810 A1 | 12/2004 | Das et al. | |
| 2004/0260711 A1 | 12/2004 | Chessell et al. | |
| 2005/0048564 A1 | 3/2005 | Emili | |
| 2005/0055369 A1 | 3/2005 | Gorelik et al. | |
| 2005/0065914 A1 | 3/2005 | Chang et al. | |
| 2005/0071320 A1 | 3/2005 | Chkodrov et al. | |
| 2005/0102325 A1 | 5/2005 | Gould | |
| 2005/0114368 A1 | 5/2005 | Gould et al. | |
| 2005/0114369 A1* | 5/2005 | Gould ................... | G06F 16/258 |
| 2005/0154715 A1 | 7/2005 | Yoaz et al. | |
| 2005/0177578 A1 | 8/2005 | Chen et al. | |
| 2005/0192994 A1 | 9/2005 | Caldwell et al. | |
| 2005/0240354 A1 | 10/2005 | Mamou | |
| 2006/0041544 A1 | 2/2006 | Santosuosso | |
| 2006/0069717 A1 | 3/2006 | Mamou | |
| 2006/0074881 A1 | 4/2006 | Vembu et al. | |
| 2006/0294055 A1 | 12/2006 | Santosuosso | |
| 2007/0011668 A1 | 1/2007 | Wholey et al. | |
| 2007/0050381 A1 | 3/2007 | Hu et al. | |
| 2007/0073721 A1 | 3/2007 | Belyy et al. | |
| 2007/0288490 A1 | 12/2007 | Longshaw | |
| 2007/0299832 A1 | 12/2007 | Chang et al. | |
| 2008/0071904 A1 | 3/2008 | Schuba et al. | |
| 2008/0189269 A1 | 8/2008 | Olsen | |
| 2008/0215602 A1 | 9/2008 | Samson et al. | |
| 2008/0222089 A1 | 9/2008 | Stewart et al. | |
| 2008/0306920 A1 | 12/2008 | Santosuosso | |
| 2009/0216717 A1 | 8/2009 | Suereth et al. | |
| 2009/0226916 A1 | 9/2009 | DeSimas | |
| 2010/0057777 A1 | 3/2010 | Williamson | |
| 2010/0114976 A1 | 5/2010 | Castellanos | |
| 2010/0250563 A1 | 9/2010 | Wu et al. | |
| 2011/0029478 A1 | 2/2011 | Broeker | |
| 2011/0040874 A1 | 2/2011 | Dugatkin | |
| 2011/0066602 A1 | 3/2011 | Studer et al. | |
| 2011/0119221 A1 | 5/2011 | Mishra | |
| 2011/0137940 A1 | 6/2011 | Gradin | |
| 2011/0153667 A1 | 6/2011 | Parmeter et al. | |
| 2011/0225191 A1 | 9/2011 | Xie | |
| 2011/0313979 A1* | 12/2011 | Roberts ............. | G06F 16/24565 707/690 |
| 2012/0158745 A1* | 6/2012 | Gorelik .................. | G06F 16/00 707/748 |
| 2012/0197887 A1* | 8/2012 | Anderson ........... | G06F 16/2365 707/736 |
| 2012/0281012 A1 | 11/2012 | Neway | |
| 2012/0323927 A1 | 12/2012 | Froemmgen | |
| 2013/0024430 A1 | 1/2013 | Gorelik | |
| 2013/0031044 A1 | 1/2013 | Miranda | |
| 2013/0031367 A1* | 1/2013 | Mao ....................... | H04L 63/10 713/168 |
| 2013/0159353 A1 | 6/2013 | Fuh | |
| 2013/0166576 A1 | 6/2013 | Hudzia et al. | |
| 2014/0095233 A1 | 4/2014 | Yeung | |
| 2014/0222752 A1 | 8/2014 | Isman | |
| 2018/0165181 A1 | 6/2018 | Isman et al. | |

FOREIGN PATENT DOCUMENTS

| | | |
|---|---|---|
| CN | 101208696 | 6/2008 |
| CN | 101271471 | 9/2008 |
| CN | 101661510 | 3/2010 |
| CN | 102203773 | 9/2011 |
| CN | 102436420 | 5/2012 |
| CN | 102681946 | 9/2012 |
| CN | 103080932 | 5/2013 |
| CN | 103348598 | 10/2013 |
| EP | 1302871 | 4/2003 |
| JP | 03-00293 8 | 1/1991 |
| JP | H07-502617 | 3/1995 |
| JP | 08-030637 | 2/1996 |
| JP | 10-055367 | 2/1998 |
| JP | 10-091633 | 4/1998 |
| JP | 10-320423 | 12/1998 |
| JP | 11-23 8065 | 8/1999 |
| JP | 2001-43237 | 2/2001 |
| JP | 2002-024262 | 1/2002 |
| JP | 2007066017 | 3/2007 |
| JP | 2012503256 | 2/2012 |
| WO | WO 00/57312 | 9/2000 |
| WO | WO 00/79415 | 12/2000 |
| WO | WO 03/071450 | 8/2003 |
| WO | WO 2005/029369 | 3/2005 |

OTHER PUBLICATIONS

Mining Database Structure; Or, How to Build a Data Quality Browser, Tamraparni Dasu, AT&T Labs—Research, pp. 240-251.*
International Search Report & Written Opinion, PCT/2014/014186, dated Aug. 20, 2014, 13 pages.
International Search Report & Written Opinion, PCTUS2015/011518, dated May 12, 2015, (14 pages).

(56) References Cited

OTHER PUBLICATIONS

Alur et al. "IBM Websphere Information Analyzer and Data Quality Assessment", ibm.com/redbooks, Dec. 2007 p. 1-642, Retrieved from the Internet URL:http://www.ibm.com/redbooks/pdfs/sg247508.pdf.
Apte, Chidanand, et al., "Business Application for Data Mining," Aug. 2002, Communications of the ACM, vol. 45, No. 8, pp. 49-53.
"Ascential" http://www.ascentialsoftware.com (2003).
"Avellino" http://www.avellino.com (2003).
Bagchi et al.. "Dependency Interference Algorithms for Relational Database Design." Computers in Industry 14 (1990) 319-350.
Bell et al.. "Discovery of Data Dependencies in Relational Databases." LS-8 Report 14, Dortmund, Apr. 3, 1995 1-18.
Bell et al. "Discovery of Data Dependencies in Relational Databases" Research Reports of the Unit No. VIII (AI), Computer Science Department of Dortmund, DE, Apr. 1995, pp. 1-18.
Bitton et al.. "A Feasibility and Performance Study of Dependency Inference." Department of Electrical Engineering and Computer Science, University of Illinois at Chicago (1989) 635-641.
Brown et al. . "BHUNT: Automatic Discovery of Fuzzy Algebraic Constraints in Relational Data." $29^{th}$ VLDB Conference, Sep. 9, 2003, XP-002333907.
Bruno et al.. "Efficient Creation of Statistics over Query Expressions." The Computer Society (2003) 201-212.
Chaudhuri, S., "An Overview of Query Optimization in Relational Systems", XP-000782631, pp. 34-43 (1998).
Dasu et al. "Mining Database Structure; Or, How to Build a Data Quality Browser." ACM SIGMOD 2002 Conference, Jun. 4, 2002, XP-002333902, 240-251.
"Data Profiling: The Foundation for Data Management", prepared by DataFlux Corporation, XP-002313258, (2004).
"Evoke", http://www.evokesoftware.com, (2003).
USPTO Non-Final Office Action issued for U.S. Appl. No. 10/941,401, dated Jul. 21, 2009, 32 pages.
Examination Report in Canadian Application No. 2,655,735 dated May 4, 2009, 2 pages.
Examination Report in Canadian Application No. 2,655,731 dated Dec. 3, 2009, 3 pages.
Examiner's Report in Australian Application No. 2009200294, dated Jun. 12, 2012, 3 pages.
Florescu, Daniela et al., "A Performance Evaluation of Alternative Mapping Schemes for Storing XML Data in a Relational Database," May 1999, http://www.caravel.inria.fr/Fmbrepubs_dana.html, 31 pages.
Graefe, Goetz. "Query Evaluation Techniques for Large Databases." ACM Computing Surveys, vol. 25, No. 2, Jun. 1993, 98 pages.
Henrard et al.. "Data Dependency Elicitation in Database Reverse Engineering." Institut d'Informattique, University of Namur, Belgium, (2001), 11-19.
Huhtala, Y. et al., "Efficient Discovery of Functional and Approximate Dependencies Using Partitions (Extended Version)," University of Helsinki, Department of Computer Science Series of Publications C, Report C-1997-79, Nov. 1997.
Huhtala, Y. et al., "Efficient Discovery of Functional and Approximate Dependencies Using Paritions," Proceedings of the $14^{th}$ International Conference on Data Engineering, Feb. 23-27, 1998, pp. 392-401.
Huhtala et al., "TANE: An Efficient Algorithm for Discovering Functional and Approximate Dependencies", The Computer Journal, vol. 42, No. 2 (1999).
IBM "Profiling: Take the First Step Toward Assuring Data Quality," white paper, GC-18-9728-00, Dec. 2005.
International Search Report & Written Opinion, PCT/US2012/022905, dated May 2, 2012, 12 pages.
International Search Report & Written Opinion, PCT/US2013/053351, dated Oct. 25, 2013, 10 pages.
Jaedicke, et al., On Parallel Processing of Aggregate and Scalar Functions in Object-Relational DBMS, XP-002313223, pp. 379-389 (1998).
Jahnke et al.. "Adaptive Tool Support for Database Reverse Engineering." AG-Softwaretechnik, Universität Paderborn, Germany (19990, 278-282.
Japanese Office Action, application No. 2010-153799, dated Feb. 12, 2013, 4 pages.
Johnson, T et al., "Comparing Massive High-Dimensional Data Sets," Proceedings of the $4^{th}$ International Conference on Knowledge Discovery and Data Mining (KDD 98), Aug. 27-31, 1998, pp. 229-233.
Kandel et al. "Profiler: Integrated Statistical Analysis and Visualization for Data Quality Assessment" AVI '12 Proceedings of the International Working Conference on Advanced Visual Interfaces, pp. 1-8, May 2012.
Kivinen, J and H. Mannila, "Approximate Inference of Functional Dependencies from Relations," Theoretical Computer Science, vol. 149, Sep. 18, 1995, pp. 129-149.
Kouris I N et al. "Using Information Retrieval Techniques for Supporting Data Mining" Data & Knowledge Engineering, Elsevier BC, NL, vol. 52, No. 3, Mar. 2005, pp. 353-383.
Lee, Kyong-Ha et al., "Bitmap Indexes for Relational XML Twig Query Processing," OIKM '09, Nov. 2-6, 2009, 10 pages.
Lemire et al. "Sorting Improves Word-Aligned Bitmap Indexes" Data & Knowledge Engineering, Dec. 2009, pp. 1-43.
Li et al., "A Practical External Sort for Shared Disk MPPs", http://www.thearling.com/text/sc93/sc93.
Lopes, S. et al., "Efficient Discovery of Functional Dependencies and Armstrong Relations," Proceedings of the $7^{th}$ International Conference on Extending Database Technology (EDBT 2000), LNCS 1777, Mar. 27-31, 2000, pp. 350-364.
Mannila, Heikki, "Theoretical Frameworks for Data Mining," Jan. 2000, SIGKDD Explorations, vol. 1, No. 2, pp. 30-32.
Milne, Robert et al., "Predicting Paper Making Defects On-line Using Data Mining," Jul. 24, 1998, Knowledge-Based Systems, vol. 11, pp. 331-338.
Munakata, Koichi, "Integration of Distributed Heterogeneous Information Sources," with English Translation. Systems, Control and Information, Japan, The Institute of Systems, Control and Information Engineers, Dec. 15, 1996, vol. 40, No. 12, pp. 514-521.
Notification of Reason(s) for Refusal in Japanese Patent Application No. 2006-526986, dated Oct. 13, 2010, 3 pages.
Novelli, N. et al., "FUN: An Efficient Algorithm for Mining Functional and Embedded Dependencies," Proceedings of the $8^{th}$ International Conference on Database Theory (ICDT 2001), LNCS 1973, Jan. 4-6, 2001, pp. 189-203.
Office Action issued in Japanese Application No. 2010-153799, English Translation included, dated May 8, 2012, 6 pages.
Office Action issued in Japanese Application No. 2010-153800, English Translation included, dated May 8, 2012, 5 pages.
Office Action issued in Japanese Application No. 2006-526986, English Translation included, dated Nov. 22, 2012, 61 pages.
Olson, "Know Your Data: Data Profiling Solutions for Today's Hot Projects", XP-002313222, p. 1-4, published in DM Review, printed from DMReview.com (Mar. 2000).
Petit et al.. "Towards the Reverse Engineering of Denormalizes Relational Databases." Laboratoire d'Ingénierie des Systèmes d'Information, Lyon (1996), 218-227.
Rahm, et al., "Data Cleaning: Problems and Current Approaches", XP-002284896 (2000).
Summons to attend oral proceedings pursuant to Rule 115(a) EPC in EP application No. 04784113.5, dated Jul. 30, 2010, 8 pages.
Wyss et al.. "FastFDs: A Heuristic-Driven, Depth-First Algorithm for Mining Functional Dependencies from Relation Instances." (Extended Abstract) Computer Science Department, Indiana University XP-002333906 101-110.
Yan, Men in, et al., "Algorithm for discovering multivalued dependencies," Nov. 5-10, 2001, ACM Proceedings of the $10^{th}$ International Conference on Information and Knowledge Management, pp. 556-558.
Yao, H. et al., "FD_Mine: Discovering Functional Dependencies in a Database Using Equivalences," University of Regina, Department of Computer Science, Technical Report TR 2002-04, Aug. 2002.

(56) References Cited

OTHER PUBLICATIONS

Yao, H. et al., "FD Mine: Discovering Functional Dependencies in a Database Using Equivalencies," Proceedings of the $2^{nd}$ IEEE International Conference on Data Mining, Dec. 9-12, 2002, pp. 729-732.
Yao, Hong et al., "Mining functional dependencies from data," Sep. 15, 2007, Springer Science—Business Media, Data Mining and Knowledge Discovery, vol. 16, No. 2, pp. 197-219.
Yoon, Jong P., et al., "BitCube: A Three-Dimensional Bitmap Indexing for XML Documents," Journal of Intelligent Information Systems, Dec. 2001, 17:2/3, pp. 241-254.
Transaction History, U.S. Appl. No. 10/941,402.
Transaction History, U.S. Appl. No. 10/941,373.
Transaction History, U.S. Appl. No. 10/941,401.
Transaction History, U.S. Appl. No. 13/360,230.
Transaction History, U.S. Appl. No. 13/827,558.
Japanese Office Action (English translation), application No. 2013-551372, dated Oct. 27, 2015 (3 pages).
Chinese Office Action, application No. 201210367944.3, dated Nov. 4, 2015 (4 pages).
Olson, Jack E. Data Profiling Technology, Chapters 7 and 8) (23 pages) Jan. 2003.
Transaction History, U.S. Appl. No. 14/519,030.
Transaction History, U.S. Appl. No. 13/957,641.
Transaction History, U.S. Appl. No. 13/957,664.
Transaction History, U.S. Appl. No. 13/958,057.
Transaction History, U.S. Appl. No. 14/059,590.
Transaction History, U.S. Appl. No. 14/625,902.
International Preliminary Report on Patentability in PCT/US2015/011518, dated Jul. 19, 2016 (10 pages).
European Search Report in Application No. 147462915, dated Sep. 5, 2016 (4 pages).
Mobasher, "Data Mining for Web Personalization", The Adaptive Web; LNCS 4321, pp. 90-135, 2007.
Gauch et al., "User Profiles for Personalized Information Access", The Adaptive Web, LNCS 4321, pp. 54-89, 2007.
Chinese First Office Action (English translation), application No. 201210367944.3, dated Mar. 27, 2015 (5 pages).
Young et al., "A Fast and Stable Incremental Clustering Algorithm." 2010 Seventh International Conference on Information Technology pp. 204-209.
Chinese Office Action (English Translation) issued in CN201580004845.0, dated Jan. 24, 2019 (English Translation), 10 pages.
Chinese Office Action (English Translation) issued in CN201580004845.0, dated Dec. 24, 2019 14 pages.
IBM "Software Announcement" Dec. 6, 2005, https://www-01.ibm.com/common/ssi/rep_ca/3/897/ENUS205-323/ENUS205-323.PDF.
CN Office action in Chinese Appln. No. 201480004942.5, dated Feb. 3, 2020, 5 pages (Machine translation).
KR Office Action in Korean Appln. No. 10-2016-7018899, dated Nov. 27, 2020, 11 pages (with English Translation).
IN Office Action in Indian Appln. No. 201617022949, dated Jul. 24, 2020, 7 pages.
CA Office Action in Canadian Appln. No. 2,934,034, dated Sep. 25, 2020, 8 pages.
CN Office Action in Chinese Appln. No. 201580004845.0, dated Aug. 14, 2020, 18 pages (with English translation).
KR Office Action in Korean Appln. No. 10-2016-7018899, dated Feb. 15, 2021, 4 pages (with English Translation).
wikipedia.com [online], "Sørensen-Dice coefficient," Jul. 2017, retrieved on Feb. 25, 2021, retrieved from URL <https://en.wikipedia.org/wiki/S%C3%B8rensen%E2%80%93Dice_coefficient>, 5 pages.

\* cited by examiner

DATABASE KEY IDENTIFICATION

BACKGROUND

This description relates to data quality.

Many businesses have large collections of data sets, linked together by keys. These data sets may be tables in a relational database or they may be flat files in a disk storage system. The collections may number in the hundreds or thousands of data sets, with tens of keys or more. The structure may be undesigned, arising from an accumulation of data over time from multiple sources. There may once have been a design, but that design has been lost, forgotten, or is known to be out-of-date. The design may be known only to specialists but is otherwise undocumented. Or, the design may be known and current, but it is not enforced.

SUMMARY

In general, one innovative aspect of the subject matter described in this specification can be embodied in methods that include the actions of receiving an identification of a first field in a first data set, the first data set including a plurality of records. The methods include the actions of identifying a set of values, the set including, for each record, a value in the respective record associated with the field. The methods include the actions of generating a filter mask based on the set of values, where application of the filter mask is capable of determining that a given value is not in the set of values. The methods include the actions of receiving a second data set, the second data set including a second field, the second data set including a plurality of records. The methods include the actions of determining a count of a number of records in the second data set having a value associated with the second field that passes the filter mask. The methods also include the actions of storing the count in a profile.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The methods may include the actions of determining the Sørensen-Dice coefficient of the set of values and the records in the second data set having a value associated with the second field. Generating a filter mask may include for each value in the set of values and generating a filter key for the corresponding value. Generating a filter key for the corresponding value may include generating a hash value for the corresponding value, segmenting the hash value into a predetermined number of integers, creating a filter key by setting bits in a bit vector based on the integers. Generating the filter mask may include performing a binary operation on each of the generated filter keys. Determining a count of a number of records in the second data set having a value associated with the second field that passes the filter mask may include calculating a second filter key for a value associated with the second field and comparing the second filter key to the filter mask.

Aspects can include one or more of the following advantages. Confidence can be established in a data quality program. Unknown or unsuspected relationships may be revealed. Information of which fields hold shared values may be discovered. Discrepancies between expected relationships and identified relationships can be discovered. An accurate data structure on which to base further data quality analysis may be determined. In particular, the discovered structure of key relationships may be used as the starting point from which to quantify the referential integrity of the collection of data sets.

Other features and advantages of the invention will become apparent from the following description, and from the claims.

DESCRIPTION

Figure 1:
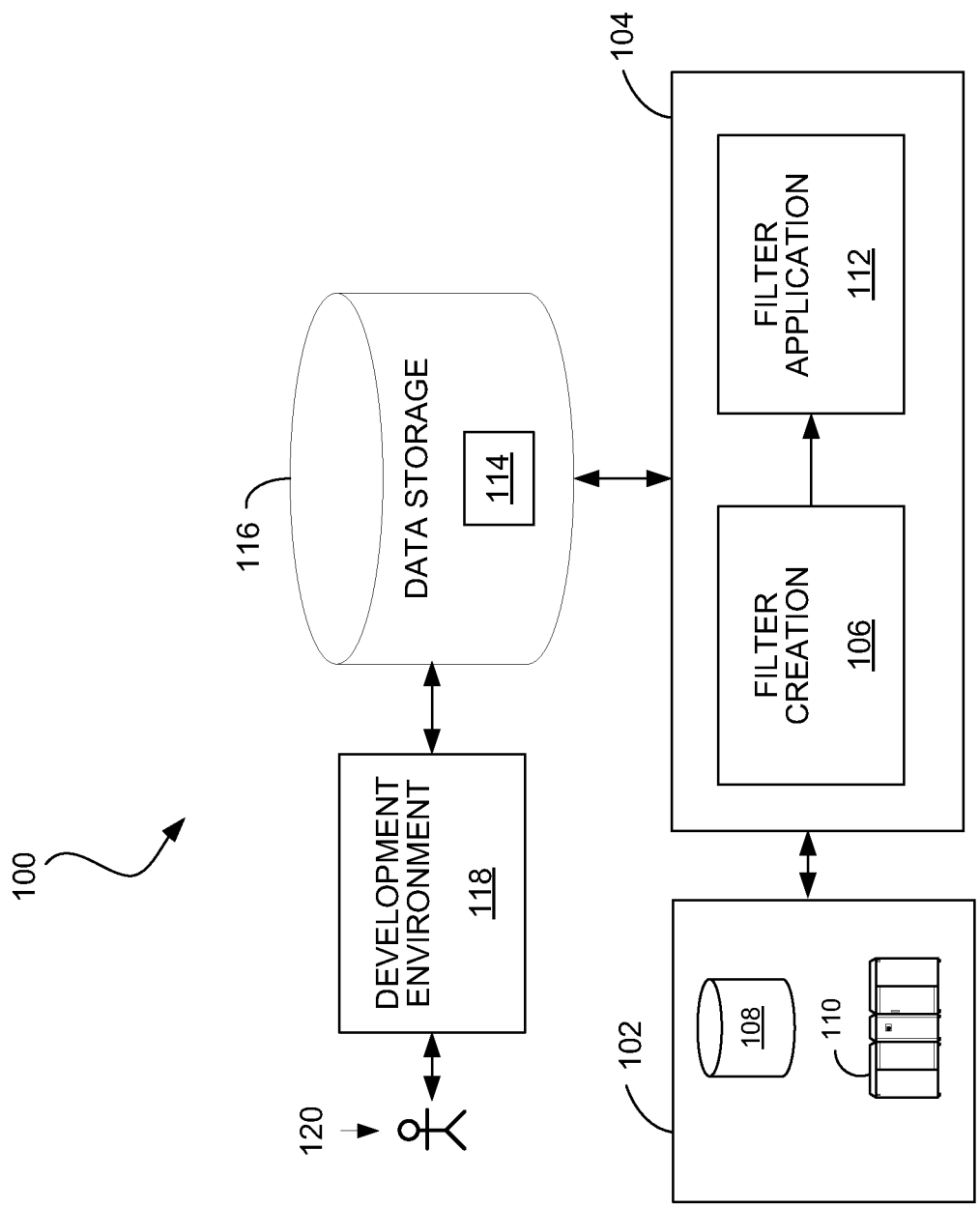
FIG. 1 shows an example of a data processing system in which the database crawling techniques can be used.

Institutions collect large amounts of data. The data is collected over a large period of time. Over time, new data sets are created and old data sets are changed. It can be difficult to identify relationships between data sets.

In general, data sets are structured sets of data. The data set is broken up into discrete records. Each record of a data set shares a common record format. For example, a relational database table includes rows of data, each record (e.g. row) of data conforms to the database schema definition of the table. A schema can include a definition of a table (or data set). Generally, the schema defines one or more fields that exist in the data set. These records can be identified by using one or more of the fields as a key. In general, "a primary key" is one or more fields whose values uniquely identify each record in the data set.

In some implementations, a primary key includes one or more fields in the record. The key may be derived from business information contained within the record, for example, a first name and last name and current address may identify a customer (for example, "John", "Smith", "154 Locke Lane").

One type of primary key is a "surrogate key". A surrogate key is a unique identifier, or primary key, that is not derived from business information. For example, a surrogate key may be selected from a numerical sequence. Surrogate keys can be unique for each data set or may be unique across all data sets within a particular system (for example, across all the data sets for a particular company). For example, a number "10234" may identify the record for John Smith of 154 Locke Lane. Because business information may change (for example, John Smith may move from 154 Locke Lane to 275 Greenwood Ave) or may not be unique (for example, there may be a John Smith of 154 Locke Lane and a John Smith Jr. of 154 Lock Lane), surrogate keys are generally preferred. As used herein, surrogate keys that are unique for all data sets within a particular domain are referred to as "system-wide surrogate keys". Surrogate keys that are unique within a data set are referred to as "data set surrogate keys".

Data sets can also be related to other data sets, and records within a data set can be related to records in other data sets. Generally, relationships between data sets and records are described by using a "foreign key". A foreign key is a field defined in the data format of a data set whose values refer to the primary key of another field.

For example, a business may be organized to sell products to customers. A customer places an order which references one or more products. In order to support the business model, a customer record may be stored in a customer data set. When the customer places an order, an order record may be created in an order data set. The order record includes a field that references the customer who placed the order, typically by referencing the primary key of the customer record. More concretely, an Order Table may include a record for an order placed by John Smith. The order may have a primary key with a numeric value of 987,321 and include a "customer identifier" field which contains the numeric value 10,234 (which references John Smith of 154 Locke Lane, as described above). In this example, the customer data set may be referred to as a primary data set, the order data set (which references the customer data set) may be referred to as a secondary data set.

In general, the terms primary data set and secondary data set define characteristics of a relationship between two data sets and may not be absolute. For example, an order may include multiple line items; each line item references a different product. In this example, a line item record may be created for each product. The line item record may include a foreign key that references the order record. In this example, as per the order to line item relationship, the order is the primary data set and the line item is the secondary data set. A data set may also be a part of multiple relationships; for example, the line item record may also reference a product record stored in a product data set. In this example, the product data set is the primary data set and the line item data set is the secondary data set.

Many data stores have mechanisms that can be used to enforce these relationships (referred to as referential integrity). However, frequently these mechanisms are not used for operational or performance reasons. Instead, systems rely on programming logic to enforce referential integrity. As a result, over time, the referential integrity of a system can degrade. Orphaned records (records in secondary data sets that lack a foreign key relationship to the primary data set) can be introduced; expected relationships may be missing; etc. In some cases, a new data set may be introduced into an existing data system (for example, during a merger effort). Equivalent primary and foreign key relationships between databases may not be precisely known.

Determining the structure of key relationships from the data rather than from the schema can be a first step in a data-driven data quality analysis of the collection of data sets. Being able to see the actual key relations present in their data gives confidence to an organization as they start a data quality program. Unknown or unsuspected relationships between data sets may be revealed; information of which fields hold shared values may be discovered. Discrepancies between expected relationships and identified relationships can be discovered. An accurate structure on which to base further data quality analysis may be determined. In general, the discovered structure of primary key foreign key relationships may be used as the starting point from which to quantify the referential integrity of the data sets in the system.

Conventional methods of reverse engineering primary key and foreign key relationships involves identifying potential foreign key fields and potential primary key fields in the different data sets. This requires comparing each value in the potential foreign key to each value in the potential primary key.

An alternative approach described herein includes utilizing a filter mask which allows for false positives (that is, the filter mask may indicate that a value is a member of a set when it is not) while eliminating the possibility of false negatives (that is, the filter mask will not indicate that the value is not a member of the set when it is). In general, a filter mask is created from the values stored in the records of the field (or fields) of the potential primary key. The value of the potential foreign key field of each record is then compared to the filter mask.

For example, one process utilizes a Bloom filter to characterize the distribution of values in each field of every data set from a designated collection of fields and data sets. A Bloom filter is a space-efficient probabilistic data structure that can be used to test whether an element is a member of a set.

FIG. 1 shows an example of a data processing system 100 in which the key matching and identification techniques can be used. In general, key matching and identification refers to a process of gathering information about one or more data sets and the information to identify potential relationships between the data sets. The system 100 includes a data source 102 that may include one or more sources of data such as storage devices or connections to online data streams, each of which may store or provide data in any of a variety of formats (e.g., database tables, spreadsheet files, flat text files, or a native format used by a computer). An execution environment 104 includes a filter mask creation module 106 and a filter mask application module 112. The execution environment 104 may be hosted, for example, on one or more general-purpose computers under the control of a suitable operating system, such as a version of the UNIX operating system. For example, the execution environment 104 can include a multiple-node parallel computing environment. This may include a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems), or remote, or remotely distributed (e.g., multiple processors coupled via a local area network (LAN) and/or wide-area network (WAN)), or any combination thereof.

The filter mask creation module 106 reads data from the data source 102 and stores a filter mask for one or more fields of a data set in the data source 102. The filter mask can be, for example, a Bloom filter.

A conventional Bloom filter includes a number of bits and one or more hash functions. Each hash function is used to map an input value into a subset of the bits in the filter key. Filter keys are combined to create a filter mask. A Bloom filter can be created by creating filter keys using a single hash function as described below.

Filter masks can be created for a field that is identified as a potential key. The filter mask can be generated using the process described below. Storage devices providing the data source 102 may be local to the execution environment 104, for example, being stored on a storage medium connected to a computer hosting the execution environment 104 (e.g., hard drive 108), or may be remote to the execution environment 104, for example, being hosted on a remote system (e.g., mainframe 110) in communication with a computer hosting the execution environment 104, over a remote connection (e.g., provided by a cloud computing infrastructure).

The filter mask application module 112 uses the filter mask generated by the filter mask creation module 106 to compare values in records of a data set. The filter mask application module may determine (among other things) for a particular field of a data set, the following: a count of the number of values that match the characteristics specified by the filter mask, as discussed below, a percentage of the number of values that match the filter mask, and/or statistics that compare the similarity of the filter mask to the values, such as a Sørensen-Dice coefficient. Other statistics may also be determined that can be used to determine whether the field in the data set is a good match for the identified key field.

The filter mask application module 112 may operate in conjunction with other data profiling modules. The output data 114 may be stored back in the data source 102 or in a data storage system 116 accessible to the execution environment 104, or otherwise used. The data storage system 116 is also accessible to a development environment 118 in which a developer 120 is able to identify one or more fields in a data set that are potential keys.

The development environment 118 is, in some implementations, a system for developing applications as dataflow graphs that include vertices (representing data processing components or data sets) connected by directed links (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Dataflow graphs made in accordance with this system provide methods for getting information into and out of individual processes represented by graph components, moving information between the processes, and defining a running order for the processes. This system includes algorithms that choose interprocess communication methods from any available methods (for example, communication paths according to the links of the graph can use TCP/IP or UNIX domain sockets, or use shared memory to pass data between the processes).

The filter mask creation module 106 can receive data from a variety of types of systems that may embody the data source 102, including different forms of database systems. The data may be organized as records having values for respective fields (also called "attributes" or "columns"), including possibly null values. When first reading data from a data source, the filter mask creation module 106 typically starts with some initial format information about records in that data source. In some circumstances, the record structure of the data source may not be known initially and may instead be determined after analysis of the data source or the data. The initial information about records can include, for example, the number of bits that represent a distinct value, the order of fields within a record, and the type of value (e.g., string, signed/unsigned integer) represented by the bits.

Figure 2:
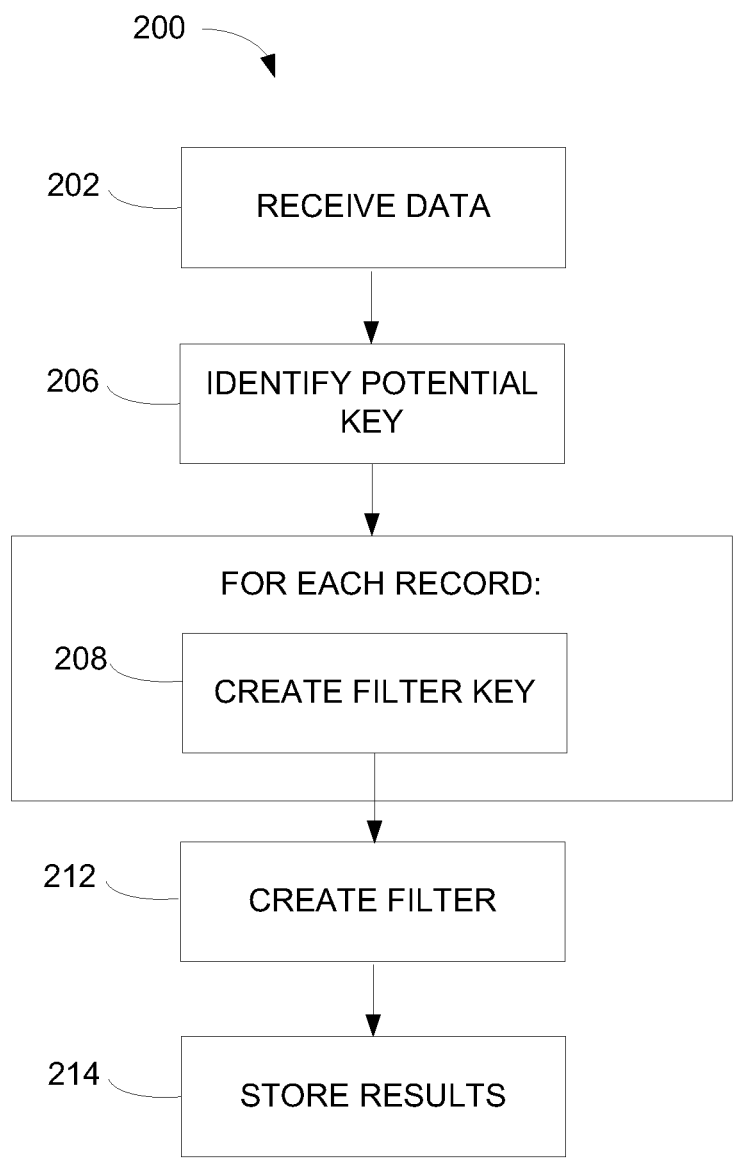
FIG. 2 shows a flowchart for an exemplary filter mask creation procedure.

FIG. 2 shows a flowchart 200 for an exemplary filter mask creation procedure 200 for use in a Bloom filter. The procedure can be performed, for example, by the filter mask creation module 106 of FIG. 1. The procedure 200 includes receiving data 202. The data can be included in a data set, such as a database table or flat file. The data may include one or more fields and one or more records, each record including values for at least some of the fields. In some scenarios, a record may include a NULL value or other indication that a value is not present for a particular field.

The procedure 200 includes identifying a potential key 206. The potential key may be made up of one or more fields. The potential key may be identified by a user or may be determined based on the data or metadata (data that describes the data). For example, a potential key may be identified by a primary key constraint on a relational database table. In general, a constraint specifies rules for data in a data set, such as a relational database table. A primary key constraint indicates that a particular field (or combination of fields) is a primary key such that the particular field (or combination of fields) uniquely identifies a record in the data set.

For each record, the procedure 200 creates a filter key 208. In general, a filter key is a sparsely populated key that can be created based on the value stored in the field of the record. In order to generate a filter mask that does not allow for false negatives, a filter key should be generated for each unique value in the field. In some implementations, unique values may be identified prior to generating the key and a key may be generated for each unique value.

Figure 3:
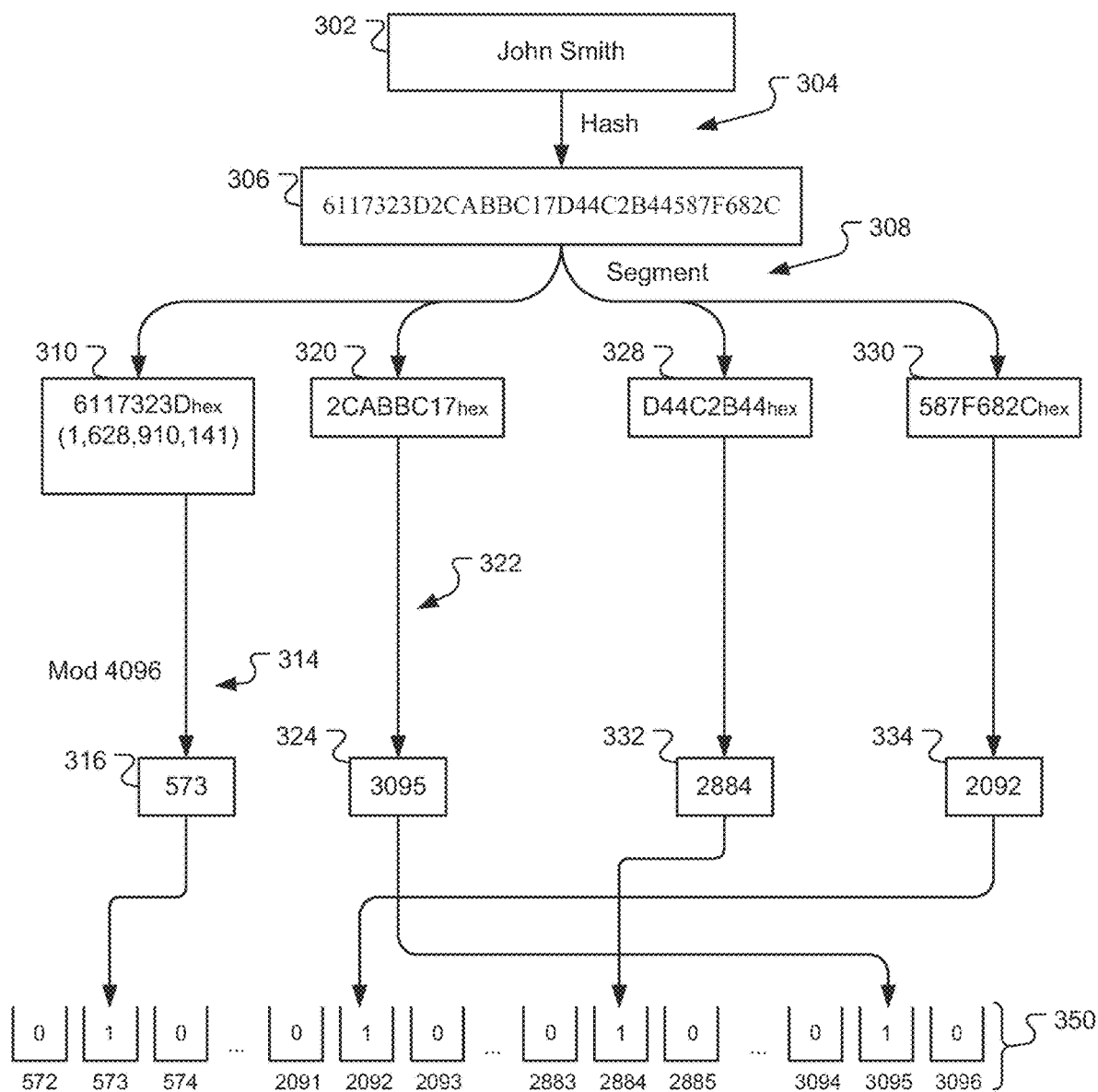
FIG. 3 illustrates an example of generating a filter key.

FIG. 3 illustrates an example of generating a filter key 350. In a conventional Bloom filter, a series of hash functions are performed on a value to identify a filter key. Each of the hash functions maps some elements to one or more bits in a bit array. In an alternative implementation, a multi-step hashing function can be used, as described below.

In this example, the field for the record includes the value 302, in this example "John Smith." A hashing algorithm 304 is applied to the value 302 to generate a hash value 306, in this example the hash value has a hexadecimal representation $6117323D2CABBC17D44C2B44587F682C_{hex}$. In general, the hashing algorithm may be any hashing algorithm that has a sufficiently low potential for collisions. In this example, an MD5 message-digest algorithm is used. The MD5 hash produces a 128-bit (16-byte) hash value. Other hashing algorithms may also be used such as SHA-1, which generates a 160-bit (20 byte) hash value, or SHA-2, which generates a 224, 256, 384, or 512 bit hash value. In general, the hashing algorithm is selected to minimize the likelihood of collisions within the data while maintaining desired performance characteristics. SHA-1 returns a 20 byte string which can be interpreted as 5 unsigned 4 byte integers. A SHA-256 returns a 32 byte string which can be interpreted as 8 unsigned 4 byte integers. In general, the size of the key and consequently the algorithm is selected based on the size of data to be analyzed. The size of the key is increased to avoid collisions in the key space. For example, a 64 MB key and a 25 million row candidate key table produces a false positive ratio of approximately 0.0004 with 5 keys (SHA-1), 0.0001 with 8 keys (SHA-256).

The procedure segments 308 the hash value 306 into numeric values, in this example, four byte integer values 310, 320, 328, and 330. For example, the md5 hash value $6117323D2CABBC17D44C2B44587F682C_{hex}$ is divided into integer values $6117323D_{hex}$, $2CABBC17_{hex}$, $D44C2B44_{hex}$, $587F682C_{hex}$. Other sizes may be used; for example, the hash value may be divided into eight-byte integer values.

For illustrative purposes, FIG. 3 shows that the hexadecimal representation of the integer value 310 (6177323D$_{hex}$) can also be represented as a decimal value (1,628,910, 141$_{decimal}$).

In scenarios where the length of a filter key is less than the maximum value of the integer (e.g. 4,294,967,295 for an unsigned four byte integer) the value of the integer may be reduced using a modulo operation. In this example, when the filter key 350 is 4096 bits in size each integer value 310, 320, 328, and 330 is adjusted by modulo 4096 to produce values 316, 324, 332, and 334.

The size of a filter key may vary depending on the system. For example, the filter key may be 8 megabytes (MB) in size, or 67,108,864 bits. The exact size is chosen based on the well understood statistics of Bloom filters for optimal performance and precision. In general, the size of the Bloom filter is selected to ensure that the filter mask is sparsely populated, that is, has a large number of unset bits ('0') with respect to set bits ('1').

The procedure maps each of the integer values into a bit in the filter key 350. In some implementations, the filter key 350 is a one dimensional array of bits. A location in the array may be determined based off of a numerical offset from the head of the array, referred to as an index. Depending on the programming language, the first bit in the array can be referenced using the index '0' (zero-based numbering) or the index '1'. In this example, the array is zero-based. Each of the integer values results in setting a single bit within the array. A bit is set to the value of '1' in index value position. In this example, the bits at index position 573, 2092, 2884, and 3095 are set to '1' and the remaining bits are set to (or remain) '0'.

Figure 4:
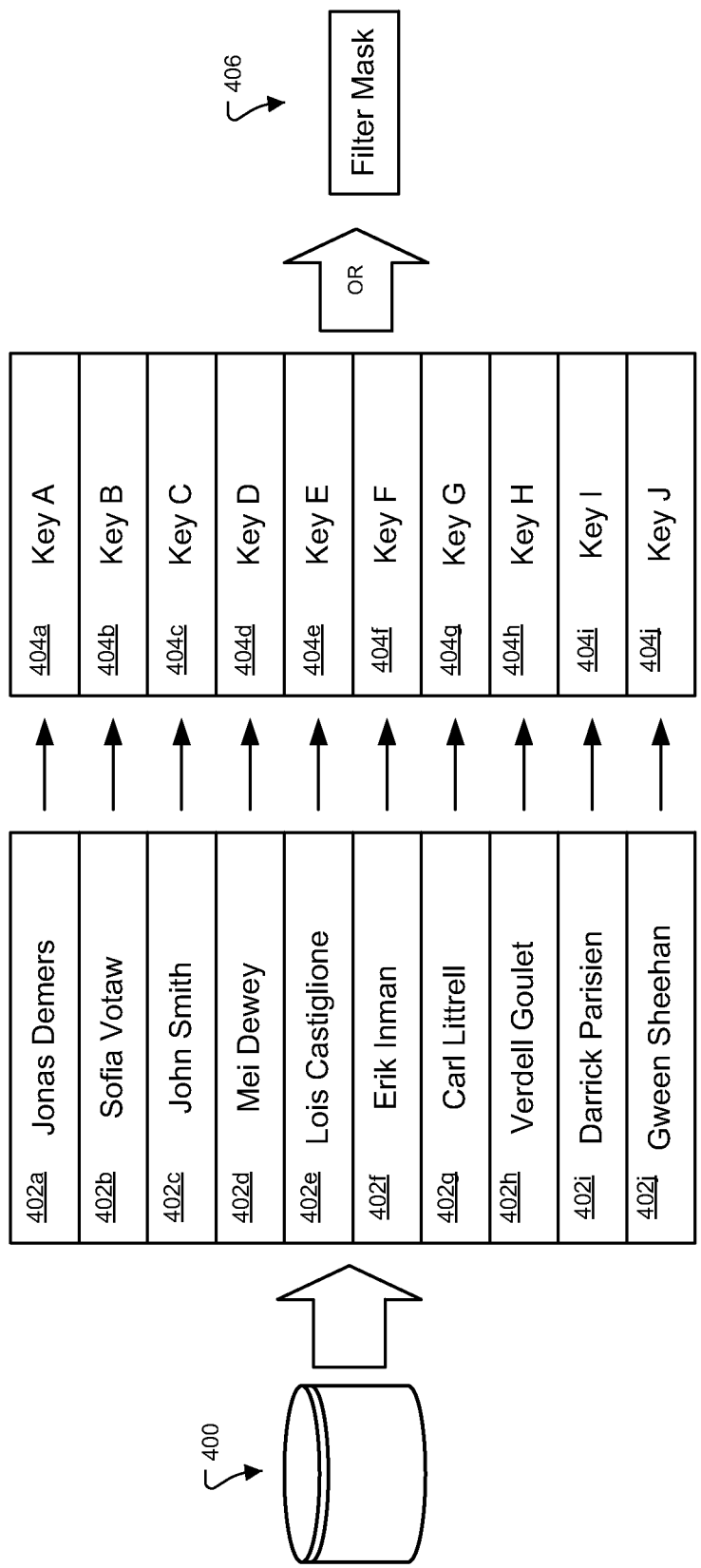
FIG. 4 illustrates creating a filter mask from the filter keys.

Referring again to FIG. 2, the procedure combines the filter keys to create a filter mask 212. FIG. 4 illustrates creating a filter mask from the filter keys. The data set includes records, each record includes values in fields 402a-j identified as a potential key. The procedure creates a filter key 404a-j for each value (for example, value Jonas Demers 402a is used to produce filter key Key A 404a, value Sofia Votaw 402b is used to produce filter key Key B 404b, etc.). The procedure combines the filter keys 404a-j to create a filter mask 406. The filter keys 404a-j can be combined, for example, by using a binary OR operation. An OR operation accepts two Boolean values (a Boolean value contains either a true or false) and returns true if either of the two values is true and false if both of the two values are false. Conventionally, a binary '1' represents a true value and a binary '0' represents a false value. A binary OR operation takes two bit patterns of equal length and performs the logical inclusive OR operation on each pair of corresponding bits. The result in each position is 1 if the first bit is 1 or the second bit is 1 or both bits are 1; otherwise, the result is 0.

For example, a binary OR of the number 10011B and the number 00010B produces:

$$\begin{array}{r} 10011B \\ 00010B \\ \hline 10011B \end{array}$$

The resulting filter mask 406 is a "fingerprint" of the contents of the potential key for the data set.

Referring to FIG. 2, the procedure can store 214 the filter mask in a persistent data store, with meta-data associated with the data set, or in any other storage medium.

Figure 5:
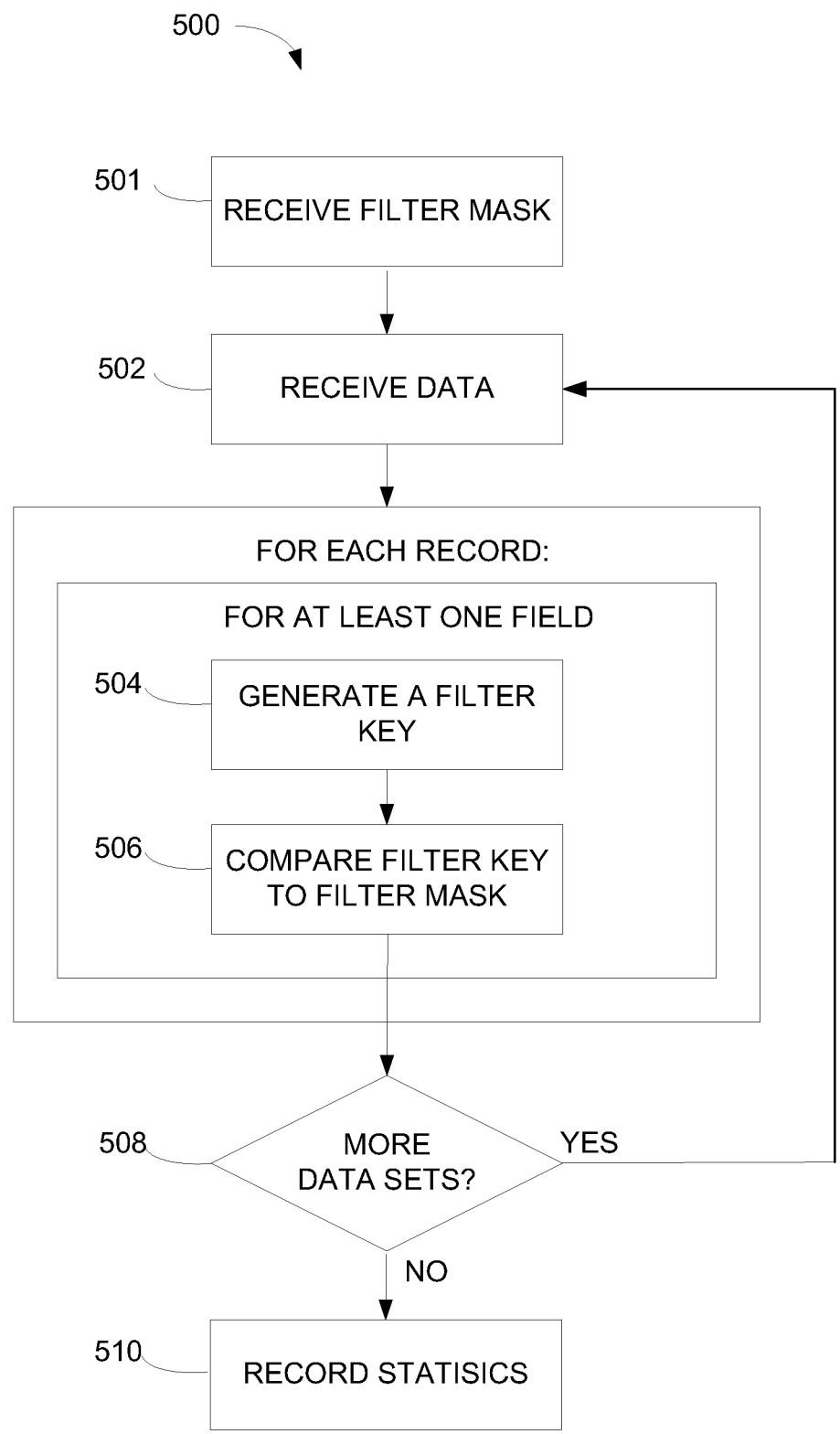
FIG. 5 shows a flowchart for an exemplary profiling procedure based on the filter mask.

FIG. 5 shows a flowchart for an exemplary profiling procedure 500 based on the filter mask. The procedure 500 receives a filter mask 501. The filter mask may be generated using the process described above. In some implementations, the procedure 500 may receive one or more filter masks. For example, a system or user may identify two data sets to be compared to attempt to identify any primary key-foreign key relationships between the two data sets. Alternatively a data set may be compared to multiple different data sets to attempt to identify any key relationships between the initial data set and all the other data sets in the system. In some implementations, a filter mask may be generated for each field in a data set. Each of the filter masks may be compared to the fields in other data sets.

The procedure 500 receives data 502 to profile. The data may include one or more data sets, each data set containing one or more fields, as well as one or more records that each includes values for the one or more fields. In some implementations, one or more fields of the data set may be optional. A record may or may not include a value for an optional field.

The procedure 500 may analyze data sets sequentially or in parallel. Each parallel process can be provided its own copy of the filter mask. While filter masks are large enough to be relatively sparsely populated, they remain relatively small when compared to the data being processed. For each record, the procedure applies the filter mask to the value for a field. In some implementations, the procedure may process a single field, for example, a predetermined row in a database table. In other implementations, the system may compare each value in the record the one or more filter masks.

In some implementations, comparing a value to the filter mask can include generating a filter key for the value 504. The filter key may be generated using the process described above with respect to FIGS. 2 and 3. In general, each filter key can be generated using the same process used to generate the keys combined to create the filter mask. Using the same process ensures that all keys are the same length as the filter mask.

The generated filter key can be compared to the filter mask by performing a binary AND operation 506. In general, an AND operation accept two values, produces an affirmative response if both of the values are true and negative response otherwise. Conventionally, a binary '1' represents a true value and a binary '0' represents a false value. A binary AND operation is a function that accepts two bit patterns of equal length and performs the AND operation on each pair of corresponding bits. The result in each position is 1 if the first bit is 1 and the second bit; otherwise, the result is 0.

For example, a binary AND of the number '10011B' and the number '00010'B produces:

$$\begin{array}{r} 10011B \\ 00010B \\ \hline 00010B \end{array}$$

The result of the binary AND operation can be compared to the filter key 506. If the result of the binary AND operation matches the filter key, then the value passes the filter and is a potential match. If the result of the binary AND operation does not match the filter key, then the value does not pass the filter and is not a match.

For example, a filter mask of 10011B is compared to a filter key of 00010B. As described above, performing a binary AND operation on the two binary numbers results in a value of 00010B. Because the result value (00010B) is the same as the filter key (00010B) the filter key passes the filer.

As a contrary example, the filter mask 10011B is compared to a filter key 01001B. A binary AND operation formed on the mask and key is shown below.

$$10011B$$
$$01001B$$
$$\overline{00001B}$$

Because the result, 00001B, does not match the filter key, 01001B, the filter key does not pass the filter.

Comparing a filter key to a filter mask is a relatively quick operation. Therefore, a large number of records can be processed more quickly and efficiently than through conventional key identification methods, which usually include comparing each value in the potentially primary key field with the each value in the potential foreign key field.

As discussed above, the filter masking algorithm can be selected to conclusively determine that an element is not a member of the set used to generate the filter mask. The results of the comparison can be stored in a persistent data store, such as a relational database or flat file.

Once the procedure has processed the determined fields for the records of the data set, the procedure can determine if there are more data sets to process 508. If there are more data sets to process, the next data set is received 502.

In some implementations, a filter mask generated from a potential primary key in a primary table can be compared to each field in a potential secondary table.

In some implementations many filter masks from different data sets may be generated at the start of the procedure 502. As candidate data sets are processed, all key masks may be loaded into computer memory. The value of each field in the candidate can be tested against each of these Bloom filters with minimal additional overhead.

Once all values are processed, the statistics are recorded and analyzed 510. Statistics can be recorded for each field that contains values that are compared to the filter mask.

Additional statistics can be calculated; for example, the procedure may determine statistics may be gathered for each column, including the number of records, the number of records where the value in the field is found in the filter mask, the number of distinct values in the field, and the Sørensen-Dice coefficient (a statistic used to compare the similarity of two samples). Other statistics used to compare the similarity between the potential key field and the target field may be determined. For example, the range (hi/lo), mean, geometric mean and standard deviation of numeric keys values of the primary table.

In some implementations, the comparing count, number of distinct values and Percent Intersection (that is, the percentage of values that occur in both the field being tested and the field being compared) and Sørensen-Dice Coeff are computed. For numeric keys the standard deviation can be computed.

In some implementations, the statistics may be formatted into a report and presented to a user.

In some implementations, the report may identify one or more fields that are matches for a foreign key primary key relationship. For example, by comparing the percentage of records where the value in the field is found in the filter mask to a threshold, for example, 60%, and comparing the Sørensen-Dice coefficient to a threshold, for example 80%, and the percent intersection to a threshold, for example 95%. Fields which match all the thresholds are presented as potential matches to a user.

In scenarios in which the data sets use system-wide surrogate keys, potential matches may be determined automatically.

In some implementations, a report may be presented to a user to enable the user to identify potential foreign key matches.

The database analysis approach described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method including:

receiving by a data processing system a first data set that includes a plurality of records;

identifying a set of one or more first fields as a potential key field representing a potential primary key of the first data set;

for a value in at least one of the one or more first fields,
performing one or more hash functions on the value to generate at least one hash value;
identifying a set of bits for a filter key; and
based on the at least one hash value, setting at least one value for one or more of the bits for the filter key;

based on set values of the bits, generating a filter key for the value in at least one of the one or more first fields;

identifying one or more filter keys that represent one or more values in the set of the one or more first fields representing the potential primary key;

generating a filter mask from the one or more filter keys representing the potential primary key field, wherein a dataset passes the filter mask, when the passed dataset has a potential primary key—foreign key relationship to the first data set;

storing, in memory, the filter mask that stores a set of bits that are generated from the one or more filter keys that represent the one or more values in the set of one or more first fields representing the potential primary key;

receiving a second data set that includes a plurality of records that have one or more second fields representing a potential foreign key;

wherein when the second data set passes the filter mask, the data processing system indicates a potential primary key—foreign key relationship between the potential key field of the first data set and the one more second fields in the second data set;

filtering by the data processing system bits representing values in the one or more second fields in the records in the second data set through the filter mask generated from the one or more filter keys that represent the one or more values in the set of one or more first fields identified as the potential key field;

determining whether the values in the one or more second fields in the records in the second data set have corresponding one or more values that pass the filter mask by being represented in the filter mask; and when one or more values in the one or more second fields are included in the set of values represented in the filter mask, indicating a potential primary key—foreign key relationship between the potential key field of the first data set and the one more second fields in the second data set.

2. The method of claim 1, further including determining a count of a number of records each having a value associated with the one or more second fields in the records in the second data set that passes the filter mask;

storing the count in a profile; and determining the Sørensen-Dice coefficient of the set of values in the filter mask and the records in the second data set having a value associated with the one or more second fields.

3. The method of claim 1, further includes:

producing for a given record a filter key that is based on values in the one or more first fields of the given record in the first data set; and generating the filter mask based on filter keys produced for the records in the first data set by combining the filter keys according to a Boolean operation.

4. The method of claim 3, wherein generating a filter key for a corresponding value includes:

generating a hash value for the corresponding value;
segmenting the hash value into a predetermined number of integers; and
generating the filter key by setting bits in a bit vector based on the integers.

5. The method of claim 3, wherein generating the filter mask further includes performing a binary operation on each of a plurality of generated filter keys.

6. The method of claim 3, further including:

determining whether the values in the one or more second fields in the records in the second data set have corresponding one or more values that pass the filter mask, including:

generating one or more second filter keys for the one or more values associated with the one or more second fields in the second data set; and comparing the one or more second filter keys to the filter mask.

7. A non-transitory computer storage medium encoded with computer program instructions that when executed by one or more computers cause the one or more computers to perform operations comprising:

receiving a first data set that includes a plurality of records;

identifying a set of one or more first fields as a potential key field representing a potential primary key of the first data set;

for a value in at least one of the one or more first fields,
performing one or more hash functions on the value to generate at least one hash value;
identifying a set of bits for a filter key; and
based on the at least one hash value, setting at least one value for one or more of the bits for the filter key;

based on set values of the bits, generating a filter key for the value in at least one of the one or more first fields;

identifying one or more filter keys that represent one or more values in the set of the one or more first fields representing the potential primary key;

generating a filter mask from the one or more filter keys representing the potential primary key field, wherein a dataset passes the filter mask, when the passed dataset has a potential primary key—foreign key relationship to the first data set;

storing, in memory, the filter mask that stores a set of bits that are generated from the one or more filter keys that represent the one or more values in the set of one or more first fields representing the potential primary key;

receiving a second data set that includes a plurality of records that have one or more second fields representing a potential foreign key;

wherein when the second data set passes the filter mask, the data processing system indicates a potential primary key—foreign key relationship between the potential key field of the first data set and the one more second fields in the second data set;

filtering bits representing values in the one or more second fields in the records in the second data set through the filter mask generated from the one or more filter keys that represent the one or more values in the set of one or more first fields identified as the potential key field;

determining whether the values in the one or more second fields in the records in the second data set have corresponding one or more values that pass the filter mask by being represented in the filter mask; and when one or more values in the one or more second fields are included in the set of values represented in the filter mask, indicating a potential primary key—foreign key relationship between the potential key field of the first data set and the one more second fields in the second data set.

8. The medium of claim 7, further including determining a count of a number of records each having a value associated with the one or more second fields in the records in the second data set that passes the filter mask;

storing the count in a profile; and determining the Sørensen-Dice coefficient of the set of values in the filter mask and the records in the second data set having a value associated with the one or more second fields.

9. The medium of claim 7, wherein the operations further include:

producing for a given record a filter key that is based on values in the one or more first fields of the given record in the first data set; and generating the filter mask based on filter keys produced for the records in the first data set by combining the filter keys according to a Boolean operation.

10. The medium of claim 9, wherein generating a filter key for a corresponding value includes:

generating a hash value for the corresponding value;

segmenting the hash value into a predetermined number of integers; and generating the filter key by setting bits in a bit vector based on the integers.

11. The medium of claim 9, wherein generating the filter mask further includes performing a binary operation on each of a plurality of generated filter keys.

12. The medium of claim 9, wherein the operations further include:

determining whether the values in the one or more second fields in the records in the second data set have corresponding one or more values that pass the filter mask, including:

generating one or more second filter keys for the one or more values associated with the one or more second fields in the second data set; and comparing the one or more second filter keys to the filter mask.

13. A system comprising:

one or more computers and one or more storage devices storing instructions that are operable, when executed by the one or more computers, to cause the one or more computers to perform operations comprising:

receiving a first data set that includes a plurality of records;

identifying a set of one or more first fields as a potential key field representing a potential primary key of the first data set;

for a value in at least one of the one or more first fields, performing one or more hash functions on the value to generate at least one hash value;

identifying a set of bits for a filter key; and based on the at least one hash value, setting at least one value for one or more of the bits for the filter key;

based on set values of the bits, generating a filter key for the value in at least one of the one or more first fields;

identifying one or more filter keys that represent one or more values in the set of the one or more first fields representing the potential primary key;

generating a filter mask from the one or more filter keys representing the potential primary key field, wherein a dataset passes the filter mask, when the passed dataset has a potential primary key—foreign key relationship to the first data set;

storing, in memory, the filter mask that stores a set of bits that are generated from the one or more filter keys that represent the one or more values in the set of one or more first fields representing the potential primary key;

receiving a second data set that includes a plurality of records that have one or more second fields representing a potential foreign key;

wherein when the second data set passes the filter mask, the data processing system indicates a potential primary key—foreign key relationship between the potential key field of the first data set and the one more second fields in the second data set filtering bits representing values in the one or more second fields in the records in the second data set through the filter mask generated from the one or more filter keys that represent the one or more values in the set of one or more first fields identified as the potential key field;

determining whether the values in the one or more second fields in the records in the second data set have corresponding one or more values that pass the filter mask by being represented in the filter mask; and when one or more values in the one or more second fields are included in the set of values represented in the filter mask, indicating a potential primary key—foreign key relationship between the potential key field of the first data set and the one more second fields in the second data set.

14. The system of claim 13, further including determining a count of a number of records each having a value associated with the one or more second fields in the records in the second data set that passes the filter mask;

storing the count in a profile; and determining the Sørensen-Dice coefficient of the set of values in the filter mask and the records in the second data set having a value associated with the one or more second fields.

15. The system of claim 13, wherein the operations further include:

producing for a given record a filter key that is based on values in the one or more first fields of the given record in the first data set; and generating the filter mask based on filter keys produced for the records in the first data set by combining the filter keys according to a Boolean operation.

16. The system of claim 15, wherein generating a filter key for a corresponding value includes:

generating a hash value for the corresponding value;

segmenting the hash value into a predetermined number of integers; and generating the filter key by setting bits in a bit vector based on the integers.

17. The system of claim 15, wherein generating the filter mask further includes performing a binary operation on each of a plurality of generated filter keys.

18. The system of claim 15, wherein the operations further include:
- determining whether the values in the one or more second fields in the records in the second data set have corresponding one or more values that pass the filter mask including:
  - generating one or more second filter keys for the one or more values associated with the one or more second fields in the second data set; and
  - comparing the one or more second filter keys to the filter mask.

* * * * *

UNITED STATES PATENT AND TRADEMARK OFFICE
CERTIFICATE OF CORRECTION

| | | |
|---|---|---|
| PATENT NO. | : 11,487,732 B2 | Page 1 of 1 |
| APPLICATION NO. | : 14/156544 | |
| DATED | : November 1, 2022 | |
| INVENTOR(S) | : Timothy Spencer Bush | |

It is certified that error appears in the above-identified patent and that said Letters Patent is hereby corrected as shown below:

In the Claims

Column 14, Line 24, Claim 13, delete "set" and insert -- set; --

Signed and Sealed this
Twentieth Day of December, 2022

*Katherine Kelly Vidal*

Katherine Kelly Vidal
*Director of the United States Patent and Trademark Office*